(12) United States Patent
Koike et al.

(10) Patent No.: US 7,572,554 B2
(45) Date of Patent: Aug. 11, 2009

(54) ELECTROLYTE

(75) Inventors: Tsuneaki Koike, Yokohama (JP); Hiroyuki Yumoto, Stevenson Ranch, CA (US); Hisashi Tsukamoto, Santa Clarita, CA (US)

(73) Assignee: Quallion LLC, Sylmar, CA (US)

( * ) Notice: Subject to any disclaimer, the term of this patent is extended or adjusted under 35 U.S.C. 154(b) by 880 days.

(21) Appl. No.: 11/072,740

(22) Filed: Mar. 3, 2005

(65) Prior Publication Data

US 2007/0065727 A1   Mar. 22, 2007

Related U.S. Application Data

(63) Continuation-in-part of application No. 11/061,973, filed on Feb. 17, 2005, and a continuation-in-part of application No. 10/984,434, filed on Nov. 8, 2004, and a continuation-in-part of application No. 10/931,740, filed on Sep. 1, 2004, now abandoned, and a continuation-in-part of application No. 10/719,276, filed on Nov. 20, 2003, now abandoned, and a continuation-in-part of application No. 10/718,981, filed on Nov. 20, 2003, and a continuation-in-part of application No. PCT/US03/27025, filed on Aug. 28, 2003, which is a continuation of application No. 10/335,168, filed on Dec. 31, 2002, now Pat. No. 6,787,268.

(60) Provisional application No. 60/456,606, filed on Mar. 20, 2003, provisional application No. 60/429,947, filed on Nov. 27, 2002, provisional application No. 60/408,100, filed on Sep. 3, 2002.

(51) Int. Cl.
*H01M 10/40* (2006.01)

(52) U.S. Cl. ....................................... 429/329; 429/337

(58) Field of Classification Search ................. 429/324, 429/326, 332, 337, 338, 339, 329
See application file for complete search history.

(56) References Cited

U.S. PATENT DOCUMENTS 5,478,671 A   12/1995   Idota
(Continued)

FOREIGN PATENT DOCUMENTS

DE   10111410 C   7/2002
(Continued)

OTHER PUBLICATIONS

Jeffsol Carbonate Distributor Sales, http://www.huntsman.com/performance_chemicals/Media/JEFFSOL_Carbonate_Distributor_Sales.PDF, p. 7.
(Continued)

*Primary Examiner*—Stephen J. Kalafut
(74) *Attorney, Agent, or Firm*—Gavrilovich Dodd & Lindsey, LLP

(57) ABSTRACT

An electrolyte for a battery comprises a lithium organoborate salt in a lactone and a low viscosity solvent. The lithium organoborate salt may comprise LiBOB, or a mono[bidentate]borate salt. The lactone may comprise gamma butyrolactone. The low viscosity solvent may comprise a nitrile, an ether, a linear carbonate, or a linear ester. The electrolyte is suitable for use in lithium ion batteries having graphite negative electrodes. Batteries using this electrolyte have high conductivity, low polarization, and high discharge capacity.

24 Claims, 4 Drawing Sheets

U.S. PATENT DOCUMENTS

| | | | |
|---|---|---|---|
| 5,478,674 | A | 12/1995 | Miyasaka |
| 5,707,756 | A | 1/1998 | Inoue et al. |
| 6,232,021 | B1 | 5/2001 | Negoro |
| 6,383,688 | B1 | 5/2002 | Inagaki et al. |
| 6,432,584 | B1 | 8/2002 | Visco et al. |
| 6,692,865 | B2 * | 2/2004 | Gan et al. ............ 429/332 X |
| 6,787,268 | B2 * | 9/2004 | Koike et al. ............ 429/332 |
| 2002/0037450 | A1 | 3/2002 | Suzuki et al. |
| 2002/0039688 | A1 | 4/2002 | Barker et al. |
| 2002/0055047 | A1 | 5/2002 | Satoh et al. |
| 2002/0061446 | A1 | 5/2002 | Gan et al. |
| 2002/0061450 | A1 | 5/2002 | Tsujioka et al. |
| 2002/0064712 | A1 | 5/2002 | Sekino et al. |
| 2002/0086216 | A1 | 7/2002 | Sekino et al. |
| 2002/0090551 | A1 | 7/2002 | Gan et al. |
| 2002/0110739 | A1 | 8/2002 | McEwen et al. |
| 2002/0122973 | A1 | 9/2002 | Manev et al. |
| 2002/0136950 | A1 | 9/2002 | Gan et al. |
| 2003/0194605 | A1 | 10/2003 | Fauteux et al. |
| 2004/0034253 | A1 | 2/2004 | Angell et al. |
| 2007/0065726 | A1 * | 3/2007 | Yumoto et al. ............ 429/326 |

FOREIGN PATENT DOCUMENTS

| | | | |
|---|---|---|---|
| EP | 1 207 567 | A2 | 5/2002 |
| EP | 1 091 963 | B1 | 10/2002 |
| JP | 05242910 | A2 | 9/1993 |
| JP | 2002-175836 | A | 6/2002 |
| WO | WO 01/24305 | A1 | 4/2001 |
| WO | WO 01/99209 | A2 | 12/2001 |
| WO | WO 01/99209 | A3 | 12/2001 |
| WO | WO 02/068432 | A1 | 9/2002 |
| WO | WO 02/068433 | A1 | 9/2002 |
| WO | WO 02/071528 | A2 | 9/2002 |
| WO | WO 2004/023577 | A2 | 3/2004 |

OTHER PUBLICATIONS

Reactive Applications of Cyclic Alkylene Carbonates, John H. Clements, http://www.huntsman.com/performance_chemicals/Media/Reactive_Applications_of_ Cyclic_ Alkylene_ Carbonates_ 110903.pdf.

Product Detail, Vinylene carbonate, https://www.sigmaaldrich.com/cgi-bin/hsrun/Suite7/Suite/Suite.hix:start=Suite.HsAdvancedSearch:formAction.

W. Xu et al., LiBOB and Its Derivatives Weakly Coordinating Anions, and the Exceptional Conductivity of Their Nonaqueous Solutions, Electrochemical And Solid-State Letters, 2001, E1-E4, 4(1).

W. Xu et al., Ionic Conductivity and Electrochemical Properties of Lithium Orthoborate Salts, http://www.electrochem.org/meetings/past/200/abstracts/symposta/bla/0107.pdf, United States, Sep. 5, 2001.

International Search Report dated Mar. 25, 2004 in International Patent Application PCT/US03/27025, International Filing Date Aug. 26, 2003.

Xu et al., Lithium Bis(oxalato)borate Stabilizes Graphite Anode in Propylene Carbonate, Electrochemical and Solid State Letters, 2002, A259-A262, 5(11).

K. Xu et al., LiBOB as Salt for Lithium-Ion Batteries, A Possible Solution for High Temperature Operation, Electrochemical and Solid State Letters, 2002, pp. A26-A29, vol. 5(1).

W. Xu et al., Structures of Orthoborate Anions and Physical Properties of Their Lithium Salt Nonaqueous Solutions, Journal of the Electrochemical Society, 2003, E74-E80, 150(1).

T. Fujii et al., Application of LiBOB as an Electrolyte Salt for 4 V Class Lithium Ion Rechargeable Cells, whttp://www2.electrochem.org/cgi-bin/abs?mtg=202&abs=0203, United States.

* cited by examiner

ELECTROLYTE

REFERENCE TO PRIOR FILED APPLICATIONS

This application is a continuation-in-part of U.S. patent application Ser. No. 11/061,973, filed on Feb. 17, 2005, and entitled "Battery Having Electrolyte with Organoborate Additive;" and this application is a continuation-in-part of U.S. patent application Ser. No. 10/984,434, filed on Nov. 8, 2004, and entitled "Battery Having High Rate and High Capacity Capabilities;" and this application is a continuation-in-part of U.S. patent application Ser. No. 10/719,276, filed on Nov. 20, 2003, and entitled "Improved Primary Battery", now abandoned, which claims the benefit of U.S. Provisional Patent Application Ser. No. 60/429,947, filed on Nov. 27, 2002, and entitled "Improved Primary Battery;" and this application is a continuation-in-part of U.S. patent application Ser. No. 10/718,981, filed on Nov. 20, 2003, and entitled "Primary Battery Having Sloped Voltage Decay" which claims the benefit of U.S. Provisional Patent Application Ser. No. 60/456,606, filed on Mar. 20, 2003, and entitled "Primary Battery Having Sloped Voltage Decay;" and this application is a continuation-in-part of U.S. patent application Ser. No. 10/931,740, filed on Sep. 1, 2004, entitled "Electrolyte", now abandoned, which is a continuation of U.S. patent application Ser. No. 10/335,168, filed on Dec. 31, 2002, issued as U.S. Pat. No. 6,787,268, and entitled "Electrolyte" which claims the benefit of U.S. Provisional Patent Application Ser. No. 60/408,100, filed on Sep. 3, 2002, and entitled "Electrolyte;" and this application is a continuation-in-part of International Patent Application number PCT/US03/27025, filed on Aug. 28, 2003, published in English as WO 2004/023577 A2, and entitled "Electrolyte;" each of which is incorporated herein in its entirety.

STATEMENT REGARDING FEDERALLY SPONSORED RESEARCH OR DEVELOPMENT

This invention was made with United States Government support under NIST ATP Award No. 70NANB043022 awarded by the National Institute of Standards and Technology (NIST). The United States Government has certain rights in the invention.

TECHNICAL FIELD

This invention relates to an electrolyte and more particularly to an electrolyte for use in a battery.

BACKGROUND

An effective Solid Electrolyte Interface layer (SEI) must be created at the surface of a graphite negative electrode of a battery in order to keep the electrolyte from decomposing. Various electrolytes comprising certain combinations of salts and solvents produce SEI layers of various qualities. Typical lithium ion batteries use an electrolyte comprising $LiPF_6$ in a carbonate solvent, with 1.2-M $LiPF_6$ in ethylene carbonate (EC): diethyl carbonate (DEC) being typical in the battery industry. EC is solid at room temperature and requires additional processing steps for employing in an electrolyte. Graphite electrodes have a fragile structure and, until the invention of the electrolyte described herein, have required the use of EC for forming the SEI layer without damaging the graphite structure. By contrast, hard carbon negative electrodes are not as easily broken and therefore can use solvents other than EC to form the SEI layer. However, while hard carbon has a higher capacity than graphite, it can absorb a lot of moisture and has a large irreversible capacity, making graphite a much more desirable electrode material than hard carbon. Vinylene carbonate (VC) and vinyl ethylene carbonate (VEC) can aid in creating an SEI layer, but is preferably used in small quantities because an excess of these solvents creates degradation at the positive electrode; with this small quantity of SEI-forming solvent, only a thin SEI layer is created, with all of the VC or VEC consumed during the first charging cycle; therefore, another SEI-forming component such as EC must be added.

SUMMARY

The electrolyte of the present invention includes or consists of one or more salts, one or more lactone solvents, and one or more low viscosity solvents. The one or more lactone solvents can include or consist of gamma-butyrolactone (GBL). The electrolyte can be capable of forming an effective SEI layer on an electrode without the addition of EC or other SEI-forming components. The electrolyte preferably does not contain a solvent that is solid at room temperature, such as ethylene carbonate (EC). In some instances, the electrolyte excludes siloxanes and/or silanes.

The one or more salts include at least one organoborate salt. In some instances, at least one organoborate salt is represented by:

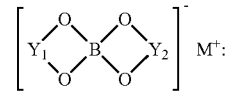

wherein $M^+$ is a metal ion selected from the Group I or Group II elements; $Y_1$ and $Y_2$ are each selected from a group consisting of: —$CX(CR_2)_aCX$—, —$CZZ'(CR_2)_aCZZ'$-, —$CX(CR_2)_aCZZ'$-, —$SO_2(CR_2)_bSO_2$—, and —$CO(CR_2)_bSO_2$—; X is =O or =NR', Z is alkyl, halogenated alkyl, —C=NR', $CR'_3$ or R'; Z' is alkyl, halogenated alkyl, —C=NR', $CR'_3$ or R'; R' is halogen or hydrogen; R is hydrogen, alkyl, halogenated alkyl, cyano, or halogen; a is 0 to 4 and b is 1 to 4. Additionally or alternately, at least one organoborate salt can be represented by:

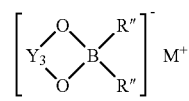

wherein $M^+$ is a metal ion selected from the Group I or Group II elements; $Y_3$ is selected from a group consisting of —$CX(CR_2)_aCX$—, —$CZZ'(CR_2)_aCZZ'$-, —$CX(CR_2)_aCZZ'$-, —$SO_2(CR_2)_bSO_2$—, and —$CO(CR_2)_bSO_2$—; X is =O or =NR', Z is alkyl, halogenated alkyl, —C=NR', $CR'_3$, or R'; Z' is alkyl, halogenated alkyl, —C=NR', $CR'_3$ or R'; R" is a halogen; R'is halogen or hydrogen; R is hydrogen, alkyl, halogenated alkyl, cyano, or halogen; a is 0 to 4 and b is 1 to 4. Preferred organoborate salts include lithium bis-oxalato borate (LiBOB) and lithium difluoro oxalato borate (LiDfOB).

Organoborate salts can be more soluble in lactone solvents, such as gamma-butyrolactone (GBL), than in commonly used carbonate solvents, such as ethylene carbonate (EC) and propylene carbonate (PC). As a result, the electrolyte can have a high salt concentration, improving conductivity as compared with using a carbonate solvent. For instance, the total concentration of the one or more salts or of the organoborate salts can be greater than 0.5 M, or greater than 1.0 M. In some instances, the total concentration of the organoborate salt is about 1.2 M.

This electrolyte system has a wide operating temperature range and therefore can be safely used in many applications, including satellites and implantable medical devices. For example, a high temperature sterilization process could not be used for many electrolytes; the salt $LiPF_6$ decomposes at about 80° C., and DEC boils at about 126° C. By contrast, LiBOB is stable at 300° C., and GBL boils at about 206° C., making this combination ideal for high temperature sterilization. At the other temperature extreme, EC has poor low temperature performance due to its high freezing point of around 37-39° C., making it very viscous at low temperatures, and therefore less desirable for applications in which low temperature operation is important.

The electrolyte is useful in primary and secondary batteries, and is especially suitable for a lithium ion battery having a graphite negative electrode, forming a functional SEI layer that does not readily decompose.

DETAILED DESCRIPTION

Figure 1:
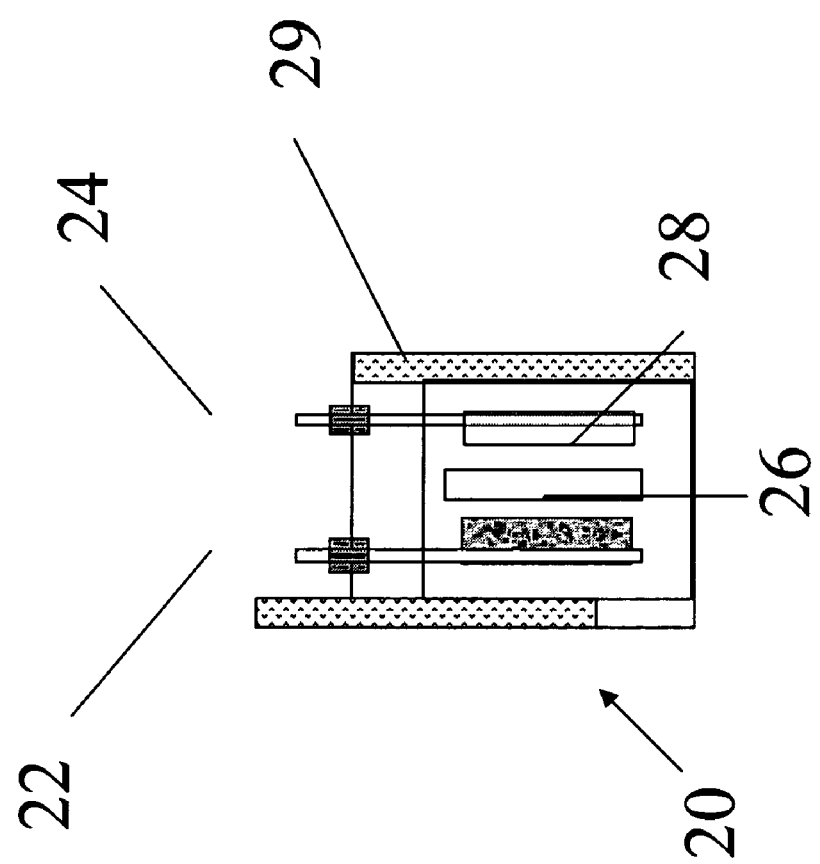
FIG. 1 shows the test set up for single cell tests described herein.

The electrolyte of the present invention is capable of forming an effective SEI layer on an electrode without the addition of EC or other SEI-forming components. The electrolyte includes one or more salts, a low viscosity solvent, and a lactone, for example, gamma-butyrolactone (GBL). The one or more salts include or consist of one or more organoborate salts.

Suitable organoborate salts for use in the electrolyte include lithium organoborate salts. The organoborate salt can be a bis[bidentate]borate, also known as a bis[chelato]borate. Suitable bis[bidentate]borates include aromatic bis[bidentate]borates such as bis[benzenediolato(2-)-O,O']borate, bis [substituted benzenediolato(2-)-O,O']borate, bis[salicylato] borate, bis[substituted salicylato]borate, bis[2,2'-biphenyldiolato(O,O')]borate, and bis[substituted 2,2'-biphenyldiolato(O,O')]borate]. In some instances, the organoborate salt is a nonaromatic bis[bidentate]borate, such as bis[oxalato(2-)-O,O']borate, bis[malonato(2-)-O,O']borate, bis[succinato]borate, [.alpha.-hydroxy-carboxylato]borate, [.alpha.-hydroxy-carboxylato]borate, [.beta.-hydroxy-carboxylato]borate, [.beta.-hydroxy-carboxylato]borate, [.alpha.-dicarboxylato]borate, and [.alpha.-dicarboxylato] borate. Examples of lithium bis(bidentate) salts include lithium bis(tetrafluoroethylenediolato)borate LiB$(OCF_2CF_2O)_2$, lithium bis(hexafluoropropylenediolato)borate LiB$[OCF(CF_3)CF_2O]_2$ and lithium bis[1,2-tetrakis(trifluoromethyl)ethylenedialato(2-)O,O-']borate or lithium bis (perfluoropinacolato)borate LiB$[OC(CF_3)_2C(CF_3)_2O]_2$. A preferred lithium bis(bidentate) salt is lithium bis-oxalato borate (LiBOB).

One example of the organoborate salt includes: a boron linked directly to at least two oxygens and an organic moiety linking two of the oxygens. In some instances, the boron is also linked directly to two halogens. Another example of the organoborate salt includes: a boron linked directly to each of four oxygens; a first organic moiety linking two of the oxygens; and a second organic moiety linking the other two oxygens. The first organic moiety and the second organic moiety can be the same or different. The first organic moiety and/or the second organic moiety can be: substituted or unsubstituted; and/or branched or unbranched; and/or saturated or unsaturated. The backbone of an organic moieties extending between the boron linked oxygens can include only carbons or can include carbons and one or more oxygens. In some instances, one or both of the organic moieties are halogenated. In one example, the first organic moiety and/or the second organic moiety is fluorinated.

An example of the organoborate salt is represented by the following Formula I-A:

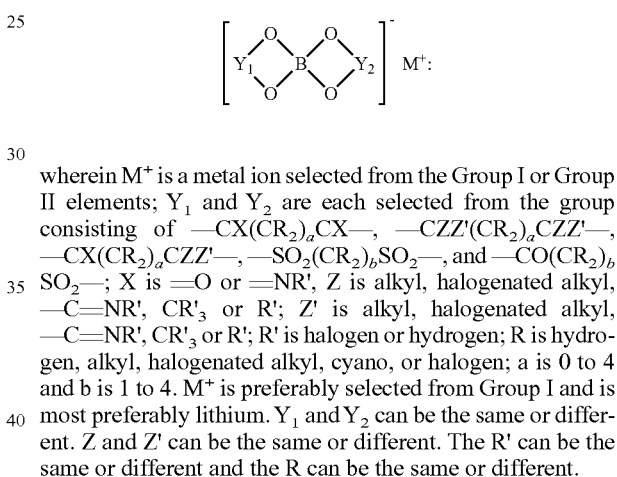

wherein $M^+$ is a metal ion selected from the Group I or Group II elements; $Y_1$ and $Y_2$ are each selected from the group consisting of —CX$(CR_2)_a$CX—, —CZZ'$(CR_2)_a$CZZ'—, —CX$(CR_2)_a$CZZ'—, —SO$_2(CR_2)_b$SO$_2$—, and —CO$(CR_2)_b$SO$_2$—; X is =O or =NR', Z is alkyl, halogenated alkyl, —C=NR', CR'$_3$ or R'; Z' is alkyl, halogenated alkyl, —C=NR', CR'$_3$ or R'; R' is halogen or hydrogen; R is hydrogen, alkyl, halogenated alkyl, cyano, or halogen; a is 0 to 4 and b is 1 to 4. $M^+$ is preferably selected from Group I and is most preferably lithium. $Y_1$ and $Y_2$ can be the same or different. Z and Z' can be the same or different. The R' can be the same or different and the R can be the same or different.

In an example of an organoborate salt according to Formula I-A, $Y_1$ and $Y_2$ are each —CX$(CR_2)_a$CX—; each X is =O and each R is hydrogen. In another example of the organoborate salt, $Y_1$ and $Y_2$ are each —CX$(CR_2)_a$CX—; each X is =O and each R is a halogen. In another example of the organoborate salt, $Y_1$ and $Y_2$ are each —CX$(CR_2)_a$CX—; each X is =O and each R is fluoro.

In a preferred example of an organoborate salt according to Formula I—A, $Y_1$ and $Y_2$ are each —CZZ'$(CR_2)_a$CZZ'—; each of the R' is hydrogen and each of the R are hydrogen. In another preferred example, $Y_1$ and $Y_2$ are each —CZZ'$(CR_2)_a$CZZ'—; each of the R' is halogen and each of the R are halogens. In another preferred example, $Y_1$ and $Y_2$ are each —CZZ'$(CR_2)_a$CZZ'—; each of the R' is fluorine and each of the R are fluorine.

Other suitable organoborate salts for use with the battery include mono[bidentate]borates. For instance, the salt can be a dihalo mono[bidentate]borate such as a dihalo oxalato borate. An example of a dihalo oxalato borate is a difluoro oxalato borate. The organoborate salts can be lithium organoborate salts such as lithium mono[bidentate]borate. For instance, the salt can be a lithium dihalo mono[bidentate] borate such as a lithium dihalo oxalato borate. A preferred lithium dihalo oxalato borate is a lithium difluoro oxalato borate (LiDfOB).

The organoborate salt can include a boron linked directly to two halogens and also linked directly to two oxygens that are linked to one another by an organic moiety. The organic moiety and/or the second organic moiety can be: substituted or unsubstituted; and/or branched or unbranched; and/or saturated or unsaturated. The backbone of the organic moiety can include only carbons or can include carbons and one or more oxygens. In some instances, the organic moiety is completely or partially halogenated. In one example, the organic moiety is fluorinated.

An example of the organoborate salt is represented by the following Formula I-B:

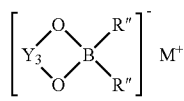

wherein $M^+$ is a metal ion selected from the Group I or Group II elements; $Y_3$ is selected from the group consisting of —CX$(CR_2)_a$CX—, —CZZ'$(CR_2)_a$CZZ'—, —CX$(CR_2)_a$CZZ'—, —SO$_2$$(CR_2)_b$SO$_2$—, and —CO$(CR_2)_b$SO$_2$—; X is =O or =NR', Z is alkyl, halogenated alkyl, —C=NR', CR'$_3$ or R'; Z' is alkyl, halogenated alkyl, —C=NR', CR'$_3$ or R'; R" is a halogen; R' is halogen or hydrogen; R is hydrogen, alkyl, halogenated alkyl, cyano, or halogen; a is 0 to 4 and b is 1 to 4. $M^+$ is preferably selected from Group I and is most preferably lithium. Z and Z' can be the same or different. The R" can be the same or different. The R' can be the same or different. The R can be the same or different.

In an example of an organoborate salt according to Formula I-B, $Y_3$ is —CX$(CR_2)_a$CX—; each X is =O and each R" is a halogen. In another example of the organoborate salt, $Y_3$ is —CX$(CR_2)_a$CX— and each R" is a fluorine.

In some instances, the organoborate salt is a tridentate borate such as a lithium tridentate borate. Alternately, the organoborate salt can be a tetradentate borate such as lithium tetradentate borate. An example lithium tetradentate borate includes LiB[OC(CF$_3$)$_2$]$_4$.

Examples of other organoborate salts are disclosed in U.S. Provisional Patent Application Ser. No. 60/565,211, filed on Apr. 22, 2004, entitled "Organoborate Salt in Electrochemical Device Electrolytes," and incorporated herein in its entirety; and in U.S. Provisional Patent Application Ser. No. 60/563,850, filed on Apr. 19, 2004, entitled "Organoborate Salt in Electrochemical Device Electrolytes," and incorporated herein in its entirety; and in U.S. Provisional Patent Application Ser. No. 60/563,848, filed on Apr. 19, 2004, entitled "Composition Check for Organoborate Salt Employed in Electrochemical Device Electrolytes," and incorporated herein in its entirety; and in U.S. Provisional Patent Application Ser. No. 60/564,778, filed on Apr. 22, 2004, entitled "Composition Check for Organoborate Salt Employed in Electrochemical Device Electrolytes," and incorporated herein in its entirety. The purification method of 60/565,211 may be used to purify the salt, and the test method of U.S. Provisional Application 60/564,778 may be used to test it. The electrolyte may be used in the batteries taught in U.S. Provisional Application Ser. No. 60/563,852, filed on Apr. 19, 2004, entitled "Battery Having Anode Including Lithium Metal," and incorporated herein in its entirety; and in U.S. Provisional Application Ser. No. 60/563,849, filed on Apr. 19, 2004, entitled "Battery Employing Electrode Having Graphite Active Material," and incorporated herein in its entirety.

A typical electrolyte comprises 1.2-M LiPF$_6$ in EC:DEC. The viscosity of EC is about 1.86 centipoise (cP) at 40° C. GBL has a viscosity of about 1.7 cP at room temperature. A low viscosity solvent is one that will lower the overall viscosity of the electrolyte comprising LiBOB and GBL and is therefore less viscous than GBL. Therefore, the low viscosity solvent itself has a viscosity of less than about 1.7 cP and more preferably less than about 1 cP. Low viscosity solvents can be chosen from among the following: nitrites such as acetonitrile, ether such as dimethyl ether (DME) or tetrahydrofuran (THF), linear carbonates such as diethyl carbonate (DEC) and methyl ethyl carbonate (MEC), and linear esters such as propyl acetate (PA) and methyl acetate (MA). In some instances, the electrolyte includes or consists of one or more low viscosity solvents selected from the group consisting of nitrites such as acetonitrile, ether such as dimethyl ether (DME) or tetrahydrofuran (THF), linear carbonates such as diethyl carbonate (DEC) and methyl ethyl carbonate (MEC), and linear esters such as propyl acetate (PA) and methyl acetate (MA). An advantage of using a noncarbonate low viscosity electrolyte is that carbonates tend to generate CO$_2$ gas when decomposing, which can cause the battery to swell.

FIG. 1 shows the test set up for tests carried out to ascertain rate and cycle life properties of the electrolyte of the present invention using a single cell 20. A negative electrode 22 comprising graphite active material on a copper substrate is separated from a positive electrode 24 comprising a positive active material on an aluminum substrate by a separator 26. The electrodes 22 and 24, separator 26, and electrolyte 28 are enclosed by an aluminum foil bag 29 to form cell 20.

Figure 2:
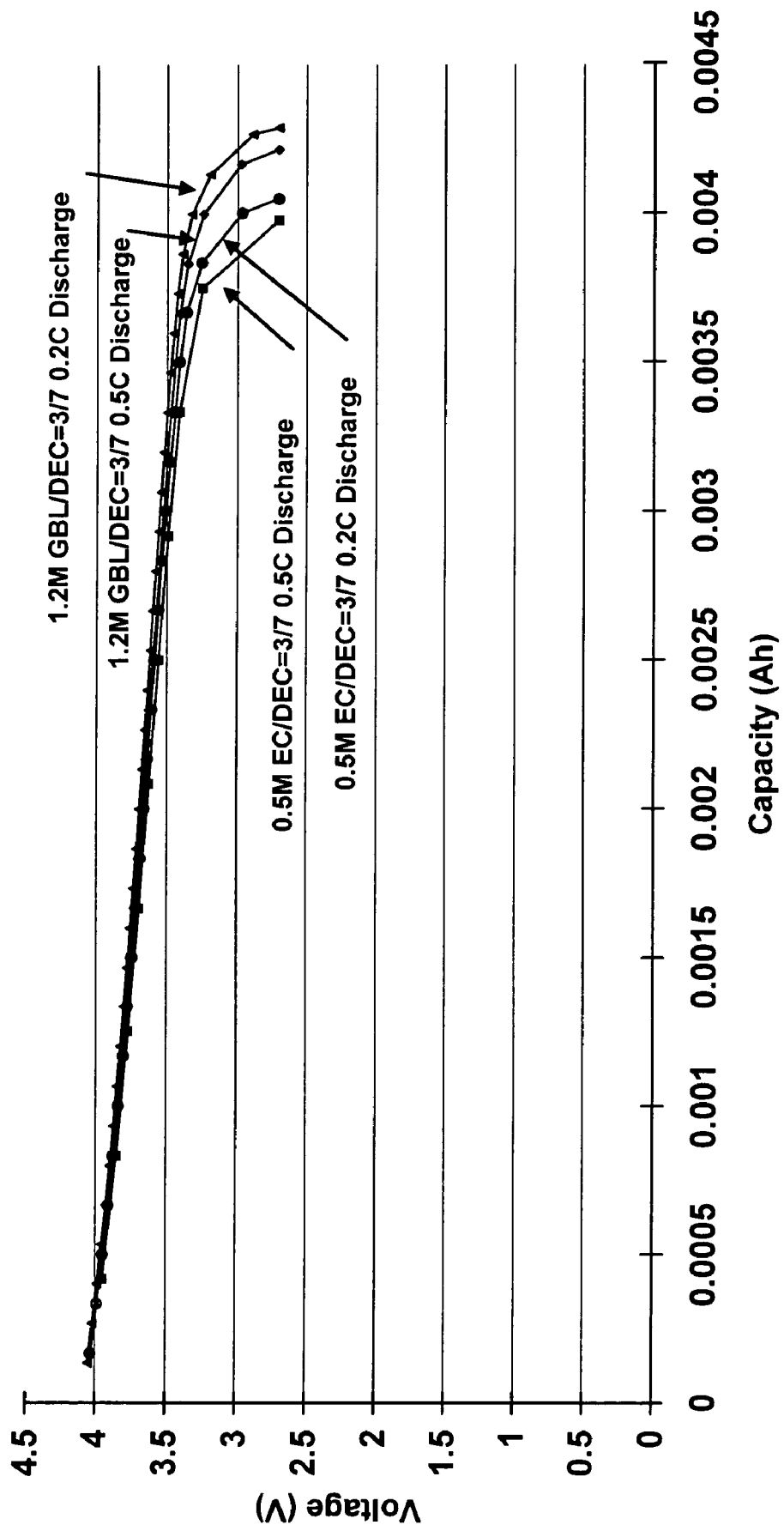
FIG. 2 is a graph of the comparison of rate properties of an electrolyte comprising LiBOB in different solvents.

FIG. 2 is a graph of the comparison of rate properties of an electrolyte comprising LiBOB in different solvents at two different discharge rates. As used herein, ratios are by volume, unless otherwise noted. LiBOB is much more soluble in GBL than in EC. 0.5-M LiBOB in 3:7 EC:DEC, which is a commonly-used solvent combination, is a saturated solution, whereas 1.2-M LiBOB in 3:7 GBL:DEC is close to saturated. Because so much more LiBOB salt can dissolve in 3:7 GBL:DEC than in 3:7 EC:DEC, the conductivity can be made much higher for 3:7 GBL:DEC than for 3:7 EC:DEC. This increase in conductivity reduces polarization, which leads to greater discharge capacity. Therefore, GBL mixed with a low viscosity solvent enables LiBOB, which is inherently safer than LiPF$_6$ and LiBF$_4$, to be used where large discharge capacity is required.

Figure 3:
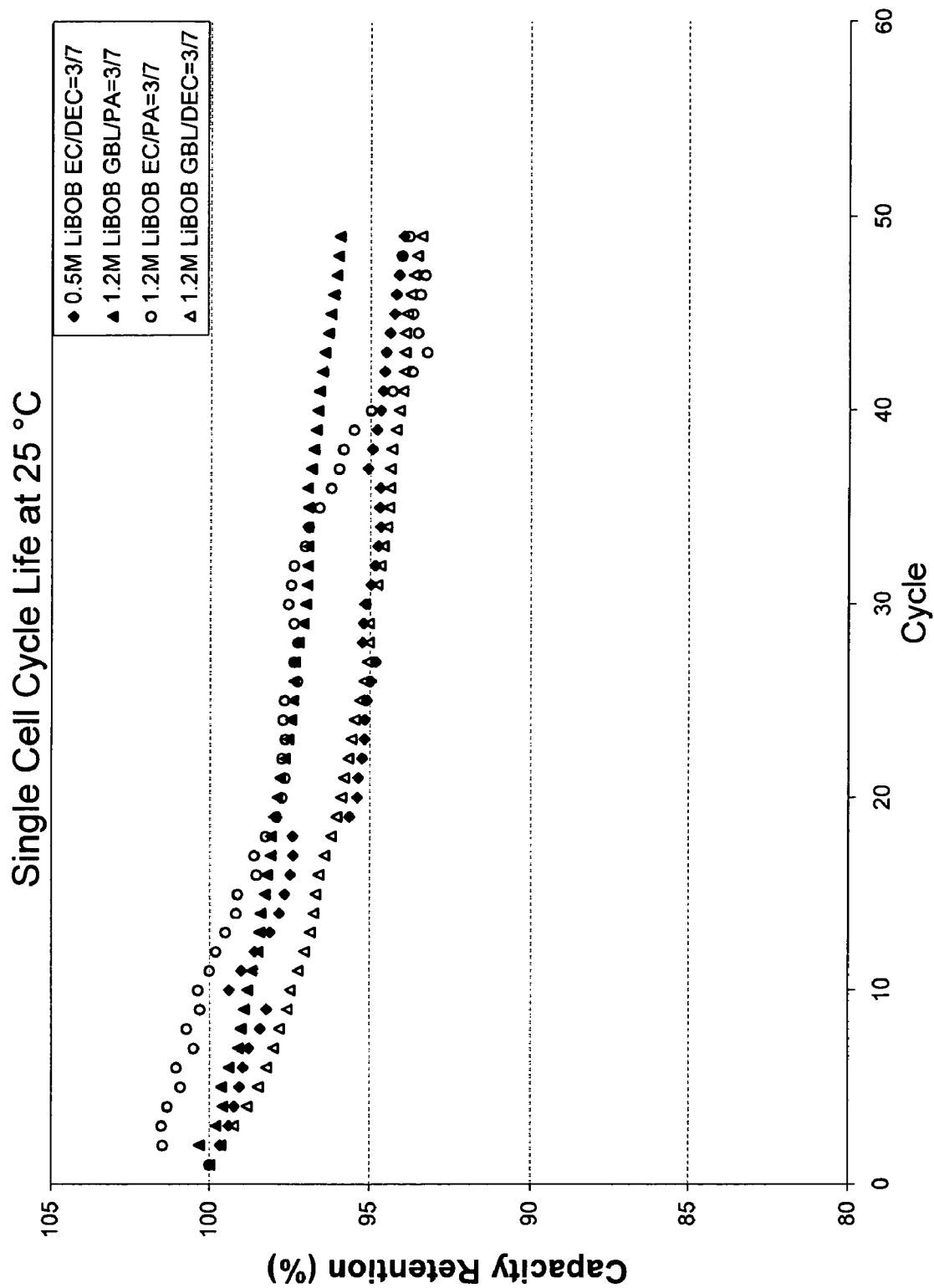
FIG. 3 is a graph showing capacity retention data of cells using electrolytes of the present invention compared with cells using electrolytes containing EC.

FIG. 3 is a graph showing capacity retention of single cells using electrolytes of the present invention compared with cells using electrolytes containing EC, using a graphite negative electrode 22 and LiNi$_{0.8}$Co$_{0.15}$Al$_{0.05}$O$_2$ positive electrode 24 using the setup as shown in FIG. 1. Both of the inventive solvent combinations shown have good capacity retention, with LiBOB in GBL/PA somewhat better than LiBOB in GBL/DEC.

Figure 4:
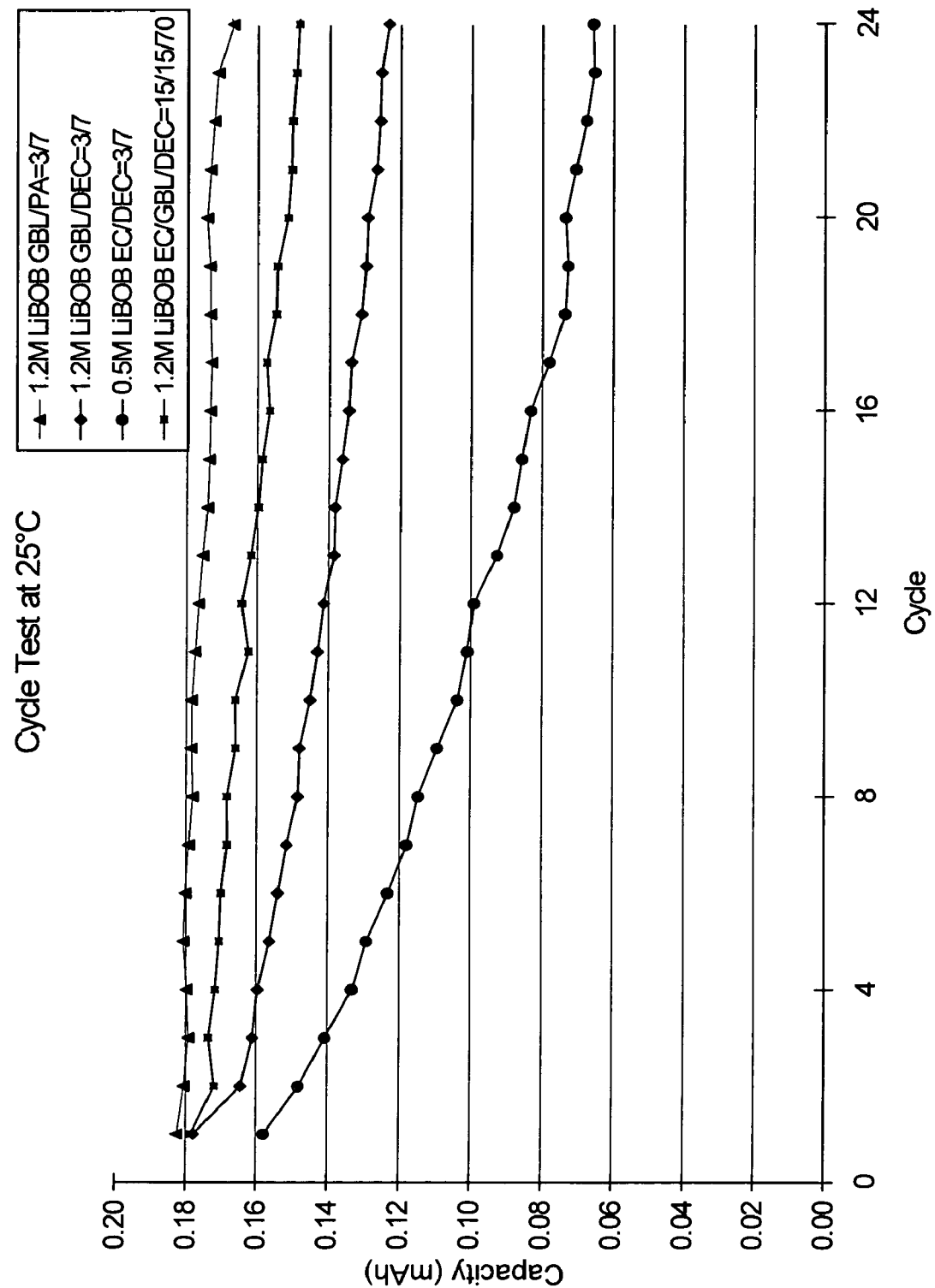
FIG. 4 is a graph showing capacity cycle life data of cells using electrolytes of the present invention compared with cells using electrolytes containing EC.

FIG. 4 is a graph showing cycle life data of spiral wound batteries using the same electrolytes of the present invention as in FIG. 3 compared with cells using electrolytes containing EC. The tests were done using a graphite negative electrode 22 and LiCoO$_2$ positive electrode 24. In this test, the starting discharge capacity at the first cycle is less important than the slope of the curve, which is ideally zero. Both of the present invention solvent combinations were shown to have good cycle life, comparable to or better than those containing EC. Therefore, the inventors have discovered that EC is not a necessary electrolyte component for forming an SEI layer on graphite, and that the combination of LiBOB with GBL and a low viscosity solvent such as PA or DEC is suitable for use as a battery electrolyte.

An electrolyte of the present invention may be made simply by combining a measured mass of GBL with a measured mass of low viscosity solvent, such as PA, then dissolving in a measured mass of LiBOB salt. The entire process may be completed at room temperature, or even lower, if desired.

By contrast, an electrolyte containing EC requires first melting the EC at elevated temperature such as in an oven in a dry environment, which can take about 5 hours for a 1-L bottle. Then the melted EC must be transferred immediately to an argon box and accurately weighed. Then it must be quickly combined with one or more additional weighed solvents, and then the measured mass salt dissolved before the EC begins to recrystallize. Because of the additional steps of melting the EC and the required use of heat, manufacturing an EC-containing electrolyte is more expensive than manufacturing the electrolyte of the present invention. Scaling up the EC-containing electrolyte manufacturing process is costly, requiring expensive equipment.

A battery of the present invention may be made by housing an electrode assembly in a battery case and inserting an electrolyte as described herein into the case, wherein the electrolyte comprises LiBOB salt in a combined solvent of lactone, preferably GBL, and a low viscosity solvent. The negative electrode of the electrode assembly may comprise graphite, hard carbon, lithium, lithium alloy, SiO, Si, SnO, Sn, and/or any other negative electrode material known in the art. The negative electrode may further comprise a negative electrode substrate made of copper, titanium, nickel, or stainless steel. The positive electrode may comprise a carbon fluoride, a cobalt oxide, a nickel oxide, a nickel cobalt oxide, a manganese oxide, a manganese cobalt oxide, a nickel cobalt manganese oxide, silver vanadium oxide (SVO), a lithium titanium oxide, iodine, and/or any other positive electrode material known in the art. The positive electrode may further comprise a positive electrode substrate made of aluminum, nickel, titanium, or stainless steel. The battery may be a primary or secondary (rechargeable) battery. If it is a rechargeable battery, it may be a lithium ion battery having a liquid electrolyte, or may have a polymer electrolyte, which could be a gel or a solid in combination with a liquid electrolyte. For an implantable medical device, the device housing and/or the battery, which may be housed within the device housing, is hermetically sealed. For a medical device requiring high temperature sterilization or for other high temperature applications, the low viscosity solvent is preferably chosen to have a high boiling point, such as greater than 126° C.

While the invention herein disclosed has been described by means of specific embodiments and applications thereof, numerous modifications and variations could be made thereto by those skilled in the art without departing from the scope of the invention set forth in the claims. Furthermore, various aspects of the invention may be used in other applications than those for which they were specifically described herein.

What is claimed is:

1. A battery, comprising:
   an electrolyte activating one or more anode and one or more cathodes, the electrolyte including one or more low viscosity solvents, one or more lactones, and one or more salts, wherein the one or more salts includes at least one mono[bidentate]borate salt.

2. The battery of claim 1 wherein at least one mono[bidentate]borate salt includes a dihalo mono[bidentate]borate.

3. The battery of claim 1, wherein at least one mono[bidentate]borate salt includes a lithium dihalo mono[bidentate]borate.

4. The battery of claim 1, wherein at least one mono[bidentate]borate salt includes lithium difluoro oxalatoborate (LiDfOB).

5. The battery of claim 1, wherein at least one mono[bidentate]borate salt is represented by:

$$\left[ Y_3 \diagup\!\!\!\!\diagdown_{\phantom{B}}^{\phantom{B}} B \diagup\!\!\!\!\diagdown_{\phantom{B}}^{\phantom{B}} \begin{matrix} R'' \\ R'' \end{matrix} \right]^- M^+$$

wherein $M^+$ is a metal ion selected from the Group I or Group II elements; $Y_3$ is selected from the group consisting of —CX$(CR_2)_a$CX—, —CZZ'$(CR_2)_a$CZZ'—, —CX$(CR_2)_a$CZZ'—, —SO$_2$$(CR_2)_b$SO$_2$—, and —CO$(CR_2)_b$SO$_2$—; X is =O or =NR'; Z is alkyl, halogenated alkyl, —C=NR', CR'$_3$ or R'; Z' is alkyl, halogenated alkyl, —C=NR', CR'$_3$ or R'; R'' is a halogen; R' is halogen or hydrogen; R is hydrogen, alkyl, halogenated alkyl, cyano, or halogen; a is 0 to 4 and b is 1 to 4.

6. The battery of claim 1, wherein the one or more salts consist of the at least one mono[bidentate]borate salt.

7. The battery of claim 1, wherein the electrolyte excludes siloxanes and/or polysiloxanes.

8. The battery of claim 1, wherein the one or more lactones includes gamma-butyrolactone.

9. The battery of claim 1, wherein the one or more lactones consists of gamma-butyrolactone.

10. The battery of claim 1, wherein the one or more low viscosity solvents includes a linear ester.

11. The battery of claim 1, wherein the one or more low viscosity solvents consists of a linear ester.

12. The battery of claim 1, wherein the one or more low viscosity solvents includes propyl acetate.

13. The battery of claim 1, wherein the one or more low viscosity solvents consists of propyl acetate.

14. The battery of claim 1, wherein the one or more low viscosity solvents includes methyl acetate.

15. The battery of claim 1, wherein the one or more low viscosity solvents includes a nitrile.

16. The battery of claim 1, wherein the one or more low viscosity solvents includes acetonitrile.

17. The battery of claim 1, wherein the one or more low viscosity solvents includes an ether.

18. The battery of claim 1, wherein the one or more low viscosity solvents includes dimethyl ether.

19. The battery of claim 1, wherein the one or more low viscosity solvents includes a linear carbonate.

20. The battery of claim 1, wherein the one or more low viscosity solvents includes diethyl carbonate.

21. The battery of claim 1, wherein the one or more low viscosity solvents includes methyl ethyl carbonate.

22. The battery of claim 1. wherein the one or more low viscosity solvents includes tetrahydrofuran.

23. The battery of claim 1, wherein the total concentration of the one or more salts is greater than 1.0 M.

24. The battery of claim 1, wherein the electrolyte consists of the one or more low viscosity solvents, the one or more lactones, and the one or more salts.

* * * * *